US009809027B2

(12) United States Patent
Matsumoto et al.

(10) Patent No.: US 9,809,027 B2
(45) Date of Patent: Nov. 7, 2017

(54) METHOD OF MANUFACTURING STRUCTURE AND METHOD OF MANUFACTURING LIQUID EJECTION HEAD

(71) Applicant: CANON KABUSHIKI KAISHA, Tokyo (JP)

(72) Inventors: Keiji Matsumoto, Kawasaki (JP); Jun Yamamuro, Yokohama (JP); Kazuhiro Asai, Kawasaki (JP); Kunihito Uohashi, Yokohama (JP); Seiichiro Yaginuma, Kawasaki (JP); Masahisa Watanabe, Yokohama (JP); Koji Sasaki, Nagareyama (JP); Ryotaro Murakami, Yokohama (JP); Kenji Fujii, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/595,937

(22) Filed: Jan. 13, 2015

(65) Prior Publication Data

US 2015/0197092 A1 Jul. 16, 2015

(30) Foreign Application Priority Data

Jan. 16, 2014 (JP) ................................ 2014-005744

(51) Int. Cl.

| | |
|---|---|
| ***C03C 15/00*** | (2006.01) |
| ***C03C 25/68*** | (2006.01) |
| ***B44C 1/22*** | (2006.01) |
| ***G01D 15/00*** | (2006.01) |
| ***G11B 5/127*** | (2006.01) |
| ***B41J 2/16*** | (2006.01) |

(52) U.S. Cl.
CPC ........... *B41J 2/1628* (2013.01); *B41J 2/1603* (2013.01); *B41J 2/1631* (2013.01)

(58) Field of Classification Search
CPC ............................ B41J 2/1623; B32B 37/025
USPC ........................................................... 216/36
See application file for complete search history.

(56) References Cited

U.S. PATENT DOCUMENTS

| | | | | |
|---|---|---|---|---|
| 4,293,635 A * | 10/1981 | Flint | B32B 37/226 430/271.1 |
| 6,300,426 B1 * | 10/2001 | Koyama | C09D 183/04 525/477 |

(Continued)

FOREIGN PATENT DOCUMENTS

| | | |
|---|---|---|
| JP | 11-306706 A | 11/1999 |

*Primary Examiner* — Thomas Pham
(74) *Attorney, Agent, or Firm* — Canon USA, Inc. IP Division

(57) ABSTRACT

A method of manufacturing a structure includes (1) positioning a first resin layer provided on a first supporting member on a substrate having a through hole, with the first resin layer facing toward the substrate, and releasing the first supporting member from the first resin layer; and (2) positioning a second resin layer provided on a second supporting member on the first resin layer from which the first supporting member has been released, with the second resin layer facing toward the first resin layer, and releasing the second supporting member from the second resin layer. A first resin layer portion that is above the through hole is removed before or simultaneously with the releasing of the first supporting member.

9 Claims, 5 Drawing Sheets

(56) References Cited

U.S. PATENT DOCUMENTS

| | | | | |
|---|---|---|---|---|
| 6,723,199 | B1 * | 4/2004 | Akitomo | B32B 37/223<br>156/238 |
| 2009/0153620 | A1 * | 6/2009 | Ikegame | B41J 2/14145<br>347/47 |
| 2009/0191491 | A1 * | 7/2009 | Ganjei | G03F 7/092<br>430/325 |

* cited by examiner

METHOD OF MANUFACTURING STRUCTURE AND METHOD OF MANUFACTURING LIQUID EJECTION HEAD

BACKGROUND

Field of the Invention

The present invention relates to a method of manufacturing a structure on a substrate having a through hole. The present invention also relates to a method of manufacturing a liquid ejection head that ejects a liquid such as ink.

Description of the Related Art

A method of planarizing a patterned surface by applying a resist over an uneven surface formed by a combination of a plurality of structures is disclosed by Japanese Patent Laid-Open No. 11-306706. In this method, the resist applied over the uneven surface is heated or pressurized so that recesses in the uneven surface are filled with the resist. Subsequently, etching or the like is performed on the surface thus planarized, whereby a desired resist pattern is formed.

SUMMARY OF THE INVENTION

According to a first aspect disclosed herein, there is provided a method of manufacturing a structure including (1) positioning a first resin layer provided on a first supporting member on a substrate having a through hole, with the first resin layer facing toward the substrate, and releasing the first supporting member from the first resin layer; and (2) positioning a second resin layer provided on a second supporting member on the first resin layer from which the first supporting member has been released, with the second resin layer facing toward the first resin layer, and releasing the second supporting member from the second resin layer. A first resin layer portion that is above the through hole is removed before or simultaneously with the releasing of the first supporting member.

According to a second aspect disclosed herein, there is provided a method of manufacturing a liquid ejection head, the liquid ejection head including a channel member in which an ejection orifice from which a liquid is ejected and a channel that communicates with the ejection orifice are provided; and a substrate having a supply port from which the liquid is supplied into the channel. The method includes forming at least a portion of the channel member by the method according to the first aspect of the present invention.

Further features of the present invention will become apparent from the following description of exemplary embodiments with reference to the attached drawings.

DESCRIPTION OF THE EMBODIMENTS

Figure 5A:
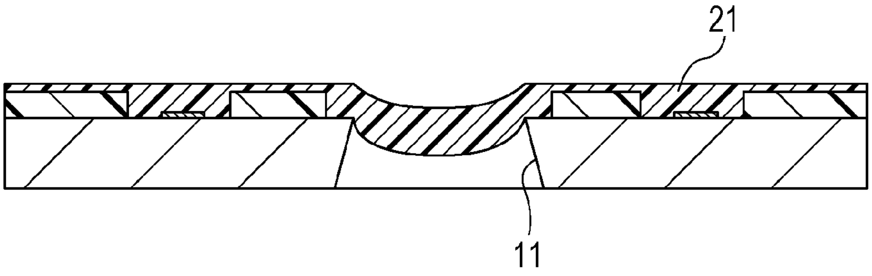
FIGS. 5A to 5C are schematic sectional views illustrating exemplary steps of manufacturing a liquid ejection head according to a known art.

If a liquid ejection head is manufactured by the method disclosed by Japanese Patent Laid-Open No. 11-306706 and by using a substrate having a through hole, the resin that has been applied and spread over the uneven surface may bend significantly in a portion thereof above the through hole, i.e., a supply port, as illustrated in FIG. 5A while the resin is heated or pressurized. If a portion of a first resin layer that is above the supply port bends significantly, a closed space may be provided between the bent portion of the first resin layer and a second resin layer that is provided thereon as a permanent resist film or the like. If such a closed space is provided, air in the closed space expands when heating is performed in a photolithographic step. Consequently, some of the structures such as an ejection orifice member may be deformed, making it difficult to accurately form the ejection orifice member and other structures in the step of forming the second resin layer on the first resin layer.

Accordingly, the present invention provides a method of accurately manufacturing a structure on a substrate having a through hole.

A liquid ejection head according to a general embodiment of the present invention can be provided in an apparatus such as a printer, a copier, a facsimile including a communications system, or a word processor including a printer unit, or an industrial recording apparatus combined with various other processing apparatuses. With such an apparatus including the liquid ejection head, recording can be performed on various recording media such as paper, thread, fibers, leather, metal, plastic, glass, wood, ceramic, and so forth. The term "recording" used herein refers to forming not only any meaningful images such as characters and illustrations but also any meaningless images such as patterns on a recording medium. The term "liquid" used herein should be broadly interpreted and refers to any liquid to be applied to a recording medium in an operation of forming an image, a pattern, or the like; an operation of processing the recording medium; or an operation of treating ink or the recording medium. Exemplary operations of treating ink or the recording medium include an improvement in the fixability achieved by the solidification or insolubilization of a coloring material contained in the ink to be applied to the recording medium, an improvement in the recording quality or the color developing quality, an improvement in the image durability, and so forth.

While the following description concerns a method of manufacturing an inkjet recording head as a typical application of the present invention, the present invention is not limited thereto. Moreover, examples of the liquid ejection head include, in addition to the inkjet recording head, those intended for manufacturing biochips, those intended for printing electronic circuits, and those intended for manufacturing color filters.

The general embodiment of the present invention relates to a method of manufacturing a structure on a substrate having a through hole.

The method according to the general embodiment includes positioning a first resin layer provided on a first supporting member on a substrate having a through hole, with the first resin layer facing toward the substrate, and releasing the first supporting member from the first resin layer.

In this step, a first resin layer portion that is above the through hole is removed before or simultaneously with the releasing of the first supporting member.

The method according to the general embodiment further includes positioning a second resin layer provided on a second supporting member on the first resin layer, from which the first supporting member has been released, with the second resin layer facing toward the first resin layer, and releasing the second supporting member from the second resin layer.

In the method according to the general embodiment, after positioning the second resin layer on the first resin layer and releasing the second supporting member, the first resin layer and the second resin layer can be processed, for example, patterned by a photolithographic method or the like, or can be heated, according to need.

According to the general embodiment, no air gap is provided between the first resin layer and the second resin layer. Therefore, even after any processing operation including heating is performed, the second resin layer is not deformed because no air gap that would expand is provided. Hence, an intended structure can be manufactured with high accuracy.

Figure 1:
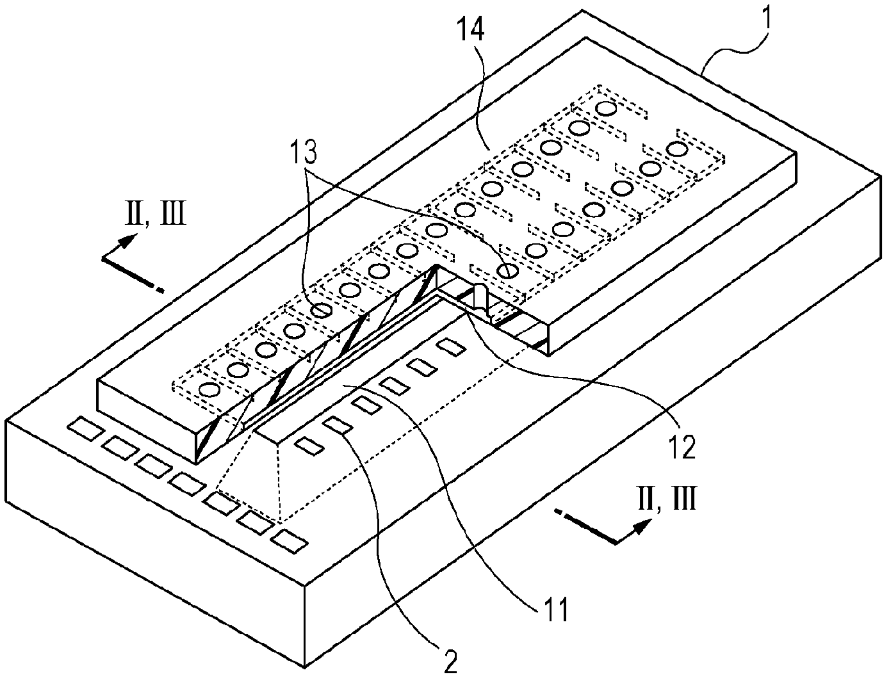
FIG. 1 is a schematic perspective view illustrating an exemplary configuration of a liquid ejection head manufactured by a method.
Figure 2:
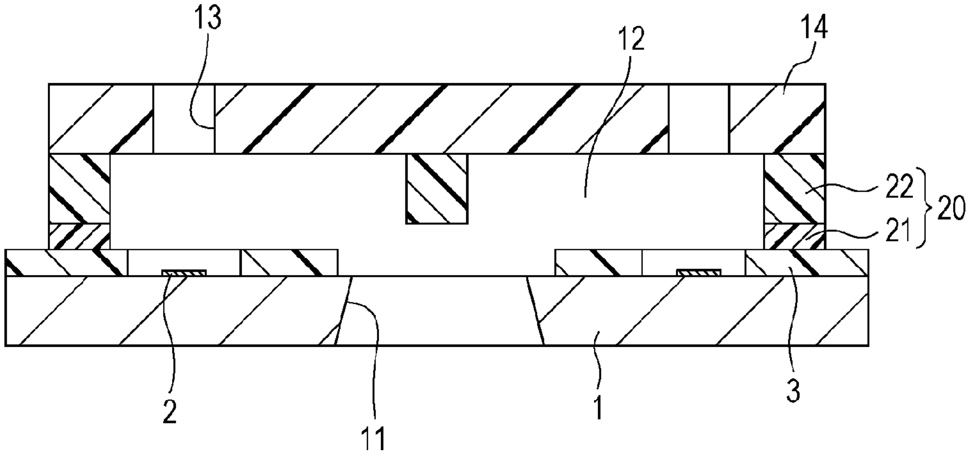
FIG. 2 is a schematic sectional view of the liquid ejection head that is taken along line II-II illustrated in FIG. 1 and in a plane perpendicular to a surface of a substrate.

FIGS. 1 and 2 are a schematic perspective view and a schematic sectional view, respectively, illustrating an exemplary configuration of a liquid ejection head manufactured by the method according to the general embodiment.

The liquid ejection head illustrated in FIG. 1 includes a substrate 1 (for example, a silicon substrate) on which two rows of ejection energy generating elements 2 that generate energy for ejecting a liquid such as ink are provided at a predetermined pitch. The substrate 1 carries an intermediate layer 3 having functions such as a function of increasing the adhesion between the substrate 1 and a channel member, and a function of protecting circuits and so forth provided on the substrate 1. The intermediate layer 3 may be, for example, a polyether amide layer. The substrate 1 further carries a channel member in which a channel 12 is provided with the aid of the substrate 1. The channel member includes a channel sidewall member 20 that provides sidewalls of the channel 12, and an ejection orifice member 14 in which ejection orifices 13 are provided. The ejection orifices 13 are positioned above the respective ejection energy generating elements 2. The channel sidewall member 20 illustrated in FIG. 2 has a two-layer structure including a first resin layer 21 and a second resin layer 22.

The substrate 1 has a supply port 11 extending therethrough and provided between the two rows of ejection energy generating elements 2. The channel 12 that allows the supply port 11 to communicate with the ejection orifices 13 is defined by the substrate 1, the channel sidewall member 20, and the ejection orifice member 14.

The liquid is supplied into the channel 12 from the supply port 11, and any of the ejection energy generating elements 2 apply pressure to the liquid, whereby droplets of the liquid are ejected from corresponding ones of the ejection orifices 13. The droplets of the liquid adhere to a recording medium. Thus, recording is accomplished.

The liquid ejection head manufactured by the method according to the general embodiment of the present invention will further be described with reference to FIG. 2.

FIG. 2 is a schematic sectional view of the liquid ejection head that is taken along line II-II illustrated in FIG. 1 and in a plane perpendicular to a surface of the substrate 1. In FIG. 2, the ejection energy generating elements 2 are provided on the substrate 1, and an insulating protection film (not illustrated) is provided over the ejection energy generating elements 2. Furthermore, the intermediate layer 3 is provided on the substrate 1. The substrate 1 has the supply port 11 from which the liquid is supplied to the channel 12 that communicates with the ejection orifices 13.

In the general embodiment, for example, the channel sidewall member 20 that provides the sidewalls of the channel 12 includes the first resin layer 21 and the second resin layer 22. Furthermore, for example, the ejection orifice member 14 can be provided as a third resin layer 14.

An exemplary embodiment of the present invention will now be described. The present invention is not limited to the following exemplary embodiment.

Exemplary Embodiment

A method of manufacturing a liquid ejection head according to an exemplary embodiment of the present invention will now be described with reference to FIGS. 3A to 3H. FIGS. 3A to 3H are schematic sectional views of the liquid ejection head that are each taken along line III-III illustrated in FIG. 1 and in a plane perpendicular to a surface of a substrate 1.

The exemplary embodiment concerns a case where a channel sidewall member includes a first resin layer and a second resin layer.

Figure 3A:
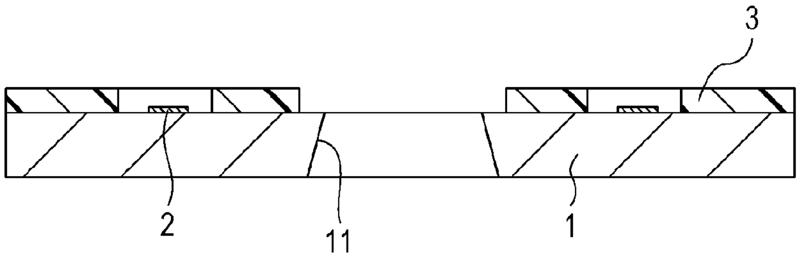
FIGS. 3A to 3H are schematic sectional views illustrating steps of manufacturing a liquid ejection head according to an exemplary embodiment.

In FIG. 3A, a plurality of ejection energy generating elements 2 are provided on the substrate 1, an insulating protection film (not illustrated) is provided over the ejection energy generating elements 2, and an intermediate layer 3 is provided on the insulating protection film. The substrate 1 has a supply port 11 as a through hole that extends therethrough from a first side (front side) to a second side (back side) opposite the first side.

The patterning of the intermediate layer 3 may be performed by photolithography or by dry etching or the like performed after a mask is formed.

The order of performing the step of providing the supply port 11 in the substrate 1 and the step of forming the intermediate layer 3 is not specifically limited.

The material of the intermediate layer 3 is not specifically limited. From the viewpoints of the adhesion between the insulating protection film and the material of the channel sidewall member and the stability with respect to the liquid such as ink, for example, the intermediate layer 3 can be made of polyether amide, epoxy resin, or the like.

The intermediate layer 3 can have various functions such as a function of increasing the adhesion between the substrate 1 and the channel sidewall member, a function of protecting circuits and so forth on the substrate 1, and a function of providing a planar surface over an uneven structure resulting from a combination of structures, such as wiring lines and heaters, provided on the substrate 1.

Figure 3B:
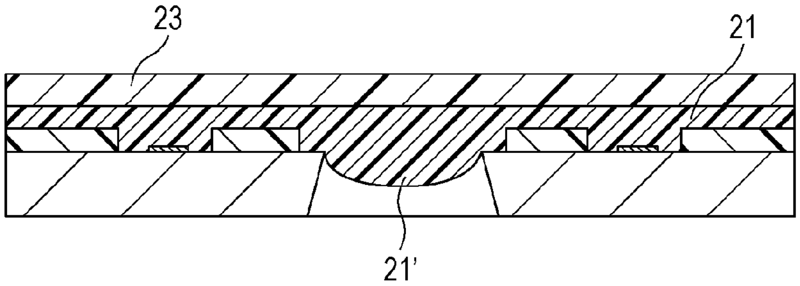

Subsequently, as illustrated in FIG. 3B, a first resin layer 21 provided on a first supporting member 23 made of a film material or the like is positioned on the substrate 1 such that the first resin layer 21 faces toward the substrate 1.

The first resin layer 21 can be made of a dry film.

The material of the first supporting member 23 is not specifically limited. Exemplary materials of the first supporting member 23 include polyethylene terephthalate, polyimide, and the like. Specifically, the first supporting member 23 can be made of a material that is stable under the heat applied thereto in the formation of the first resin layer 21.

The first resin layer 21 can be made of a negative photosensitive resin (hereinafter also referred to as a first negative photosensitive resin). Exemplary negative photosensitive resins that can be used as the first resin layer 21 include cyclized polyisoprene containing a bisazide compound, a cresol novolac resin containing azidopyrene, an epoxy resin containing a ziazonium salt or an onium salt, and the like.

The first resin layer 21 that has been subject to heat and pressure when being transferred to the substrate 1 as described above has a smaller thickness than before the transfer, and a first resin layer portion 21' that has been deformed hangs down into the supply port 11. In this step, the transfer temperature and the transfer pressure that are set during the transfer only need to allow the first resin layer 21 to be softened and to cover the uneven surface formed on the substrate 1 but to prevent the degeneration of the first resin layer 21. For example, the transfer temperature and the transfer pressure are preferably set to 50° C. or higher and 140° C. or lower and 0.1 MPa or higher and 1.5 MPa or lower, respectively.

Figure 3C:
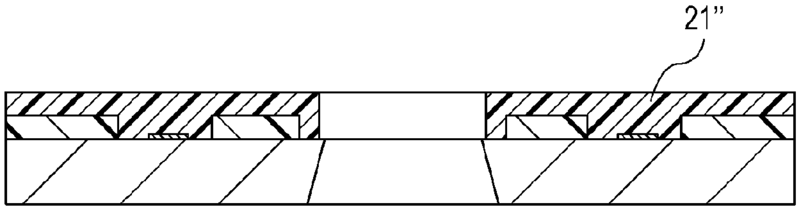

Subsequently, as illustrated in FIG. 3C, when the first supporting member 23 is released from the first resin layer 21, the first resin layer portion 21' at the supply port 11 is also removed. In the exemplary embodiment, the first supporting member 23 is released from the first resin layer 21 with the first resin layer portion 21' being stuck (fixed) to the first supporting member 23, whereby the first supporting member 23 and the first resin layer portion 21' are simultaneously removed. A remaining first resin layer portion 21" obtained after the removal of the first resin layer portion 21' from the first resin layer 21 stays on the substrate 1.

An exemplary method of facilitating the removal of the first resin layer portion 21' that is kept fixed to the first supporting member 23 is to increase the adhesion between the first supporting member 23 and the first resin layer 21 while reducing the cohesive force of the first resin layer 21 so that a cohesion failure is induced. To increase the adhesion between the first supporting member 23 and the first resin layer 21, for example, the first resin layer 21 may be formed on the first supporting member 23 that has not undergone any release promoting treatment such as application of a releasing agent. Alternatively, to reduce the cohesive force of the first resin layer 21, a resin having a relatively small molecular weight may be employed as the base resin of the first resin layer 21. Although it depends on the kind of the processing operation to be performed, a base resin having about 1000 to 6000 weight-average molecular weight, for example, is preferred. Alternatively, to reduce the cohesive force of the first resin layer 21 so as to induce a cohesion failure, the thickness of the first resin layer 21 may be reduced. Specifically, the thickness of the first resin layer 21 is preferably 10 μm or smaller, more preferably 8 μm or smaller, or much more preferably 2 μm or smaller. Furthermore, to induce a cohesion failure of the first resin layer 21, the releasing temperature at which the first supporting member 23 is released may be set to a lower value than the transfer temperature at which the first resin layer 21 is transferred. Thus, the viscosity of the first resin layer 21 may be reduced so that the first resin layer 21 can be broken easily. Specifically, the releasing temperature is preferably set to 40° C. or lower or more preferably 30° C. or lower but is preferably set to 20° C. or higher.

To facilitate the removal of the first resin layer portion 21' that is kept fixed to the first supporting member 23, the releasing speed at which the first supporting member 23 is released may be increased. Herein, the term "releasing speed" refers to the speed in a direction parallel to the surface of the substrate 1 at which the first supporting member 23 is released. Increasing the releasing speed applies a great stress to the interface between the first resin layer 21 and the substrate 1 during the releasing, making it easier to induce a cohesion failure of the first resin layer 21. For example, the releasing speed is preferably set to 20 mm/s or higher, more preferably 20 to 100 mm/s, or much more preferably 30 to 90 mm/s. Alternatively, the direction of releasing (the direction in which the first supporting member 23 is released) with respect to the supply port 11 may be selected so that the first resin layer portion 21' can be easily removed while being fixed to the first supporting member 23. For example, if the shape of an opening (the upper one of two openings) of the supply port 11 that faces toward the first resin layer 21 is defined by a plurality of sides (for example, four sides), the first supporting member 23 is released in a direction other than the directions in which the respective sides extend. In such a case, the stress produced at the releasing of the first supporting member 23 is concentrated on a corner of the opening. Consequently, a cohesion failure can be easily induced from the corner of the opening. As another alternative, the first resin layer 21 may be processed from the back side of the substrate 1 by dry etching or the like so that a cohesion failure at the first resin layer portion 21' is easily induced.

Figure 3D:
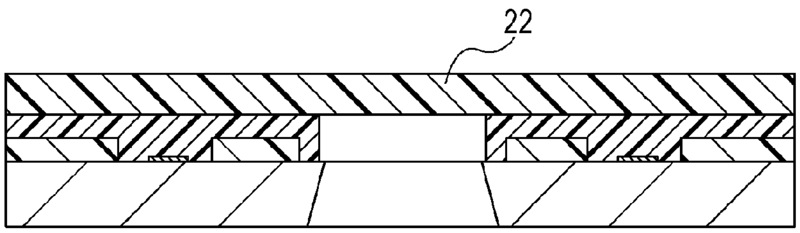

Subsequently, as illustrated in FIG. 3D, a second resin layer 22 provided on a second supporting member (not illustrated) is positioned over the remaining first resin layer portion 21" staying on the substrate 1, with the second resin layer 22 facing toward the remaining first resin layer portion 21". Then, the second supporting member is released from the second resin layer 22. Consequently, the second resin layer 22 stays on the remaining first resin layer portion 21".

The second resin layer 22 is made of, for example, a negative photosensitive resin (hereinafter also referred to as a second negative photosensitive resin). Specifically, a dry film resist can be employed as the second resin layer 22.

Even after the second supporting member has been released, the second resin layer 22 stays over the opening provided by removing the first resin layer portion 21'. Therefore, the occurrence of cohesion failure in the second resin layer 22 is prevented. To prevent the occurrence of cohesion failure, the adhesion between the second supporting member and the second resin layer 22 may be reduced, or the cohesive force of the first resin layer 21 may be increased, for example. To reduce the adhesion between the second supporting member and the second resin layer 22, a release promoting treatment, for example, may be performed on a surface of the second supporting member that is in contact with the second resin layer 22.

Figure 3E:
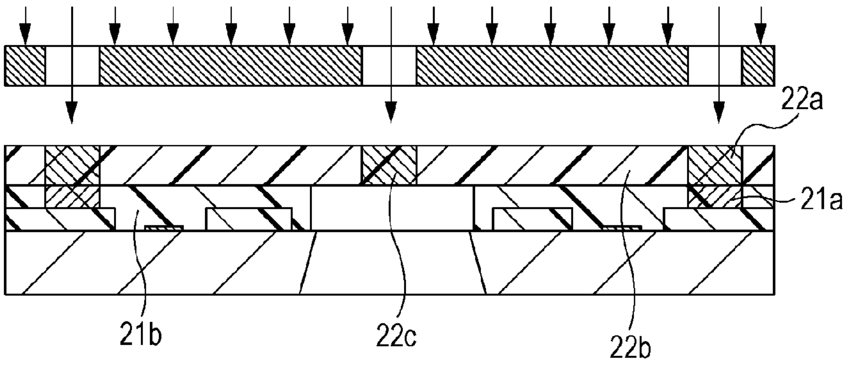

Subsequently, as illustrated in FIG. 3E, a portion of the first resin layer 21 and a portion of the second resin layer 22 that are to be left as permanent films are selectively exposed to light through a photomask, and a heat treatment (post-exposure bake, herein after abbreviated to PEB) is performed after the exposure. Thus, a first cured portion 21*a*, a second cured portion 22*a*, a third cured portion 22*c*, a first uncured portion 21*b*, and a second uncured portion 22*b* are defined optically. FIGS. 3A to 3H illustrate a case where the first resin layer 21 and the second resin layer 22 are each made of a negative photosensitive resin. Therefore, portions that have been exposed to light are left as cured portions. A combination of the first cured portion 21*a* and the second cured portion 22*a* serves as a channel sidewall member. The third cured portion 22*c* serves as a projection provided on an ejection orifice member to be formed later. The projection is positioned above the supply port 11.

Figure 3F:
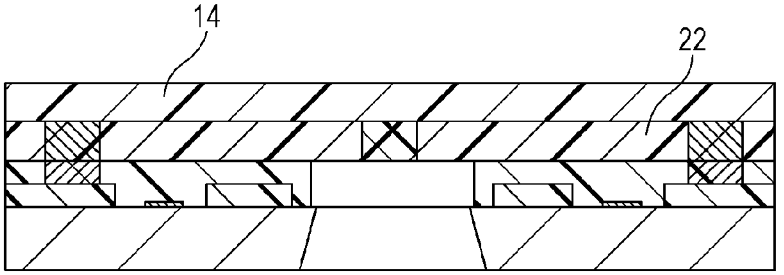

Subsequently, as illustrated in FIG. 3F, a third resin layer 14 provided on a third supporting member (not illustrated) is provided on the second resin layer 22. FIGS. 3A to 3H illustrates a case where the third resin layer 14 is made of a negative photosensitive resin (hereinafter also referred to as a third photosensitive resin).

The third resin layer 14 can be made of a dry film.

The third resin layer 14 can be made of a negative photosensitive resin.

To release the third supporting member from the third resin layer 14 without causing a cohesion failure in the third resin layer 14, the adhesion between the third supporting member and the third resin layer 14 may be reduced. To reduce the adhesion between the third supporting member and the third resin layer 14, for example, a release promoting treatment may be performed on a surface of the third supporting member that is in contact with the third resin layer 14.

Figure 3G:
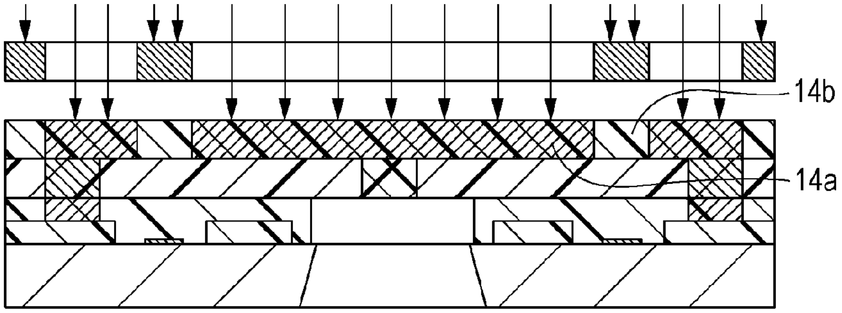

Subsequently, as illustrated in FIG. 3G, a portion of the third resin layer 14 that is to be left as a permanent film (a portion that serves as an ejection orifice member) is selectively exposed to light through a photomask, and PEB is then performed. Thus, a fourth cured portion 14*a* and third uncured portions 14*b* are defined optically.

In FIG. 3G illustrating the case where the third resin layer 14 is made of a negative photosensitive resin, the portion that has been exposed to light is cured as the fourth cured portion 14*a* and serves as an ejection orifice member (orifice plate) having ejection orifices.

In the exemplary embodiment, the third negative photosensitive resin used as the third resin layer 14 may have a higher sensitivity than the second negative photosensitive resin used as the second resin layer 22. To give a higher sensitivity to the third negative photosensitive resin than the second negative photosensitive resin, for example, the amount of photoacid generator contained in the third negative photosensitive resin can be increased while the amount of photoacid generator contained in the second negative photosensitive resin is reduced. Thus, in the exposure step illustrated in FIG. 3G, acid can be generated in the third negative photosensitive resin while the generation of acid in the second negative photosensitive resin is suppressed. Consequently, only the third negative photosensitive resin can be selectively cured in the exposure step.

Prior to the step illustrated in FIG. 3G, a water-repellent film may be formed on the third resin layer 14. Exposure may be performed after forming the water-repellent film. In this step, the portion of the second resin layer 22 that has not been exposed to light does not undergo a curing reaction.

Figure 3H:
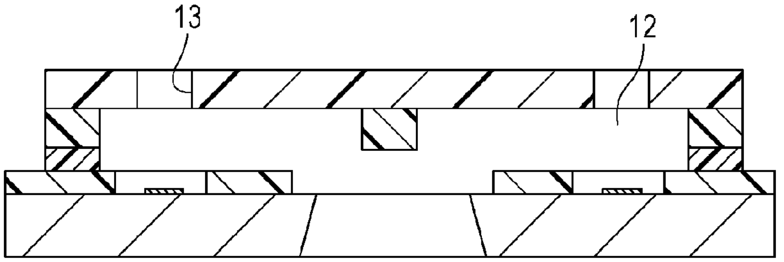

Subsequently, as illustrated in FIG. 3H, the first resin layer 21, the second resin layer 22, and the third resin layer 14 are developed. The first resin layer 21, the second resin layer 22, and the third resin layer 14 can be developed at a time. To develop the three at a time means to develop all of the three layers in a single treatment performed by using a single kind of developer. In this step, the unexposed portions are removed by a soluble solvent, whereby a channel 12 and ejection orifices 13 are provided.

Through the above series of steps, a liquid ejection head is obtained.

A wafer serving as the substrate 1 and having a plurality of liquid ejection heads collectively manufactured in accordance with the method described above is cut into chips by using a dicing saw or the like, and electric wiring lines for driving the ejection energy generating elements 2 are bonded to the individual chips. Subsequently, a chip tank member for supplying the liquid is joined to each of the chips. Thus, a recording head is complete.

In the exemplary embodiment, the second resin layer 22 and the first resin layer 21 can be made of the same base resin, and a binder resin can be added only to the second resin layer 22. The term "binder resin" refers to a resin having a higher molecular weight than the base resin and that is added to the base resin so as to increase the cohesive force of a resultant resist film and to raise the softening point of the resist film by increasing the weight-average molecular weight of the resist film. For example, if the resist used as the first resin layer 21 is made of an epoxy resin (having a weight-average molecular weight of 1000 to 3000), the resist used as the second resin layer 22 can be made of the same epoxy resin. In such a case, the binder resin can also be made of an epoxy resin (having a weight-average molecular weight of 5000 to 20000). Exemplary epoxy resins include a bisphenol A epoxy resin and a cresol novolac epoxy resin. If the first resin layer 21 and the second resin layer 22 are made of the same material, the first resin layer 21 and the second resin layer 22, which are to collectively serve as a channel sidewall member, can be patterned at a time with no stepped portions being formed therebetween.

The above exemplary embodiment concerns a case where at least a portion of the channel sidewall member is formed by using the first resin layer 21, specifically, a case where the channel sidewall member is formed by using the first resin layer 21 and the second resin layer 22. However, the present invention is not limited to such a case.

For example, the first resin layer 21 may be formed as the intermediate layer 3.

Alternatively, the first resin layer 21 may be formed as the channel sidewall member, and the second resin layer 22 may be formed as the ejection orifice member. In such a case, the first resin layer 21 tends to be relatively thick. Therefore, the first resin layer portion 21' may be removed by performing etching through the supply port 11.

EXAMPLES

Example 1

In Example 1, a dry film provided on a supporting member is provided on a substrate having a through hole and an uneven structure. Thus, a planar surface is formed over the uneven structure. Subsequently, when the supporting member is released, a portion of the dry film that is above the through hole is also removed. Thus, no bent resin film is present at the through hole. Hence, even if another dry film is provided on the former dry film, no air gap is provided between the two dry films. Therefore, a channel having a desired height can be provided easily.

In Example 1, a first negative photosensitive resin is used as the first resin layer 21, and a second negative photosensitive resin is used as the second resin layer 22. Furthermore, an epoxy resin is used as the base resin for each of the first negative photosensitive resin and the second negative photosensitive resin. Moreover, the first negative photosensitive resin and the second negative photosensitive resin are adjusted so as to have the same photosensitivity, whereby the first negative photosensitive resin is allowed to be patterned together with the second negative photosensitive resin. Therefore, in Example 1, a channel having a desired height can be provided, and liquid ejection heads each exhibiting high ejection performance can be manufactured at a high yield rate.

Example 1 will now be described with reference to FIGS. 3A to 3H.

Referring to FIG. 3A, a plurality of ejection energy generating elements 2 including respective heat generating resistors (heaters) were provided on the surface of the substrate 1. The substrate 1 was made of silicon. The heat generating resistors were made of TaSiN. The ejection energy generating elements 2 were covered with an insulating protection film (not illustrated). The insulating protection film included a SiO film and a SiN film, which were formed by plasma chemical vapor deposition (CVD). The SiO film and the SiN film had a function of protecting electric wiring lines from a liquid such as ink. Furthermore, a polyether amid layer that was to serve as an intermediate layer 3 was formed on the insulating protection film. The polyether amid layer was patterned by dry etching through a mask resist. The intermediate layer 3 thus formed had a thickness of 2 μm.

Subsequently, as illustrated in FIG. 3B, a first resin layer 21 made of a first negative photosensitive resin and provided on a first supporting member 23 made of a film material was positioned over the insulating protection film (not illustrated) and the intermediate layer 3. In this step, the first resin layer 21 on the first supporting member 23 was positioned on the substrate 1 such that the first resin layer 21 faced toward the substrate 1, that is, the first resin layer 21 was nearer to the substrate 1 than the first supporting member 23.

The first resin layer 21 was made of the first negative photosensitive resin provided in the form of a dry film, and had a thickness of 3 μm. The first resin layer 21 was positioned on the substrate 1 by using a transfer apparatus named VTM-200 of Takatori Corporation. The first negative photosensitive resin was a mixture of 100 parts by mass of an epoxy resin named EHPE3150 of Daicel Corporation and 6 parts by mass of a photo-cationic polymerization catalyst named SP-172 of ADEKA CORPORATION.

The first supporting member 23 was made of a polyethylene terephthalate (PET) film not having undergone any release promoting treatment.

The transfer temperature and the transfer pressure applied to the first resin layer 21 when the first resin layer 21 was provided on, i.e., transferred to, the substrate 1 were set to 80° C. and 0.5 MPa, respectively. The upper opening of the supply port 11 had a rectangular shape. The first supporting member 23 was released in a direction that is at 45 degrees with respect to the long-side direction of the rectangular opening and at a releasing speed of 30 mm/s.

As illustrated in FIG. 3B, a first resin layer portion 21' that was above the through hole (the supply port 11) of the substrate 1 was found to be bent.

Subsequently, as illustrated in FIG. 3C, simultaneously with the releasing of the first supporting member 23 from the first resin layer 21, the first resin layer portion 21' that was above the supply port 11 was removed. That is, the first supporting member 23 was removed from the first resin layer 21 together with the first resin layer portion 21' that was above the supply port 11 and stuck to the first supporting member 23. A remaining first resin layer portion 21" as a resultant portion of the first resin layer 21 after the removal of the first resin layer portion 21' stayed on the substrate 1.

The level difference in the uneven surface of the remaining first resin layer portion 21" after the releasing of the first supporting member 23 was 0.5 μm or smaller.

Subsequently, as illustrated in FIG. 3D, a second resin layer 22 made of a second negative photosensitive resin in the form of a dry film was formed over the remaining first resin layer portion 21". Specifically, the second resin layer 22 made of the second negative photosensitive resin and provided on a second supporting member (not illustrated) made of a film material was positioned over the remaining first resin layer portion 21". In this step, the second resin layer 22 on the second supporting member was positioned on the remaining first resin layer portion 21" such that the second resin layer 22 faced toward the substrate 1, that is, the second resin layer 22 was nearer to the substrate 1 than the second supporting member. Subsequently, the second supporting member was released from the second resin layer 22. The second resin layer 22 had a thickness of 11 μm.

The second negative photosensitive resin was a mixture of 100 parts by mass of an epoxy resin named EHPE3150 of Daicel Corporation, 6 parts by mass of a photo-cationic polymerization catalyst named SP-172 of ADEKA CORPORATION, and 20 parts by mass of a binder resin named jER1007 (a registered trademark) of Mitsubishi Chemical Corporation.

The second supporting member was made of a PET film having undergone a release promoting treatment. As the PET film having undergone a release promoting treatment, Purex (a registered trademark) of Teijin DuPont Films Japan Limited was employed.

The transfer temperature and the transfer pressure applied to the second resin layer 22 when the second resin layer 22 was provided on, i.e., transferred to, the first resin layer 21 were set to 60° C. and 0.3 MPa, respectively.

Subsequently, as illustrated in FIG. 3E, a portion of the second resin layer 22 and a portion of the first resin layer 21 that were to be left as a channel sidewall member were exposed to light. In this exposure step, a portion of the second resin layer 22 that was to serve as a projection provided above the supply port 11 was also exposed to light. Thus, a first cured portion **21*a* and a second cured portion 22*a* that were to serve as the channel sidewall member, a third cured portion 22*c* that was to serve as the projection, and a first uncured portion 21*b* and a second uncured portion 22*b* where a channel 12** was to be provided were defined optically.

The exposure was performed by using an apparatus named FPA-3000i5+ of CANON KABUSHIKI KAISHA with i-line (rays at a wavelength of 365 nm) and at an exposure value of 6000 $J/m^2$.

Subsequently, as illustrated in FIG. 3F, a third resin layer 14 made of a third negative photosensitive resin in the form of a dry film was formed on the second resin layer 22 having been exposed to light. Specifically, the third resin layer 14 made of the third negative photosensitive resin and provided on a third supporting member (not illustrated) made of a film material was positioned on the second resin layer 22 such that the third resin layer 14 faced toward the substrate 1. That is, the third resin layer 14 formed on the third supporting member was positioned on the second resin layer 22 such that the third resin layer 14 was nearer to the substrate 1 than the third supporting member. Subsequently, the third supporting member was released from the third resin layer 14. The third resin layer 14 had a thickness of 10 μm.

The third negative photosensitive resin was a mixture of 100 parts by mass of an epoxy resin named EHPE3150 of Daicel Corporation and 3 parts by mass of an onium salt functioning as a photo-cationic initiator. The onium salt had a higher photosensitivity and can produce cations at a lower exposure value than the photo-cationic polymerization catalyst SP-172 contained in the second negative photosensitive resin.

The third supporting member was made of a PET film having undergone a release promoting treatment. The transfer temperature and the transfer pressure applied to the third resin layer 14 when the third resin layer 14 was provided on, i.e., transferred to, the second resin layer 22 were set to 40° C. and 0.3 MPa, respectively.

Subsequently, as illustrated in FIG. 3G, a portion of the third resin layer 14 that was to serve as an ejection orifice member was exposed to light. Thus, a fourth cured portion 14*a* that was to serve as the ejection orifice member and as an upper wall of the channel 12 and third uncured portions 14*b* where ejection orifices were to be provided were defined optically. The exposure was performed by using an apparatus named FPA-3000i5+ of CANON KABUSHIKI KAISHA with i-line (rays at a wavelength of 365 nm) and at an exposure value of 1000 J/m$^2$.

In the exposure of the third resin layer 14 to light, the unexposed portions of the first resin layer 21 and the second resin layer 22 (the first uncured portion 21*b* and the second uncured portion 22*b*) were also exposed to light but did not undergo a curing reaction because of the difference in the photosensitivity of the material.

After the exposure step, a PEB process was performed in which the resultant structure was baked on a hot plate at 90° C. and for five minutes so as to promote the curing reaction.

Subsequently, as illustrated in FIG. 3H, the uncured portions of the first resin layer 21, the second resin layer 22, and the third resin layer 14 were removed at a time by performing a developing process, whereby a channel 12 and ejection orifices 13 were provided.

Through the above series of steps, a liquid ejection head was manufactured. The liquid ejection head thus manufactured had no distortion in the ejection orifice member, and the channel 12 had a desired height.

A wafer serving as the substrate 1 and having a plurality of liquid ejection heads collectively manufactured in accordance with the method described above was then cut into chips by using a dicing saw or the like, and electric wiring lines for driving the ejection energy generating elements 2 were bonded to the individual chips. Subsequently, a chip tank member for supplying ink was joined to each of the chips. Thus, a recording head is complete.

When printing was performed by using the recording head, favorable ejection characteristics were obtained.

Example 2

Example 2 differs from Example 1 in the method of removing the first resin layer portion 21' that is above the supply port 11. Specifically, after the first resin layer 21 is provided on the substrate 1, the second side (the back side) of the substrate 1 that is opposite the front side (the first side) is dry-etched, whereby the first resin layer portion 21' is removed. Then, the first supporting member 23 is released from the first resin layer 21. Subsequently, the second resin layer 22 is formed on the first resin layer 21. The other steps are the same as those described in Example 1, and detailed description thereof is omitted hereinafter.

In Example 2, a dry film is provided over the uneven structure formed on the substrate 1, whereby a planar surface is formed over the uneven structure. Subsequently, before the first supporting member 23 is released, the first resin layer 21 is etched from the back side of the substrate 1 through the supply port 11, whereby the first resin layer portion 21' that is above the supply port 11 is removed. Therefore, the materials of the first resin layer 21 and the first supporting member 23 can be selected more flexibly.

The method of manufacturing a liquid ejection head according to Example 2 will further be described with reference to FIGS. 4A to 4C.

Figure 4A:
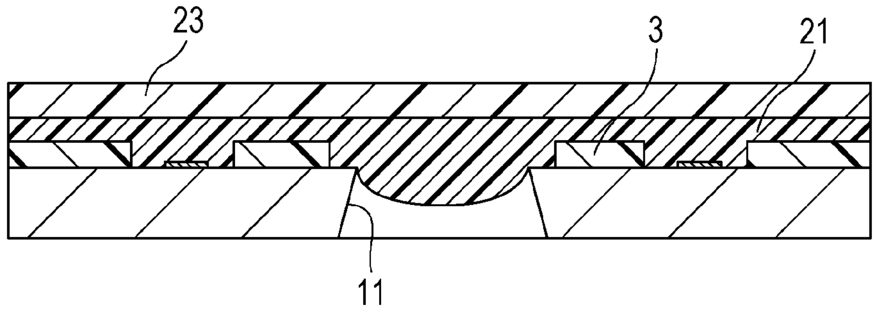
FIGS. 4A to 4C are schematic sectional views illustrating steps of manufacturing a liquid ejection head.

As illustrated in FIG. 4A, the same substrate 1 as in Example 1 was prepared, and a first resin layer 21 made of a first negative photosensitive resin in the form of a dry film was formed with a thickness of 3 μm on the first side (front side) of the substrate 1 carrying an insulating protection film (not illustrated) and an intermediate layer 3.

The first negative photosensitive resin was a mixture of 100 parts by mass of an epoxy resin named EHPE3150 of Daicel Corporation and 6 parts by mass of a photo-cationic polymerization catalyst named SP-172 of ADEKA CORPORATION. The first supporting member 23 was made of a polyimide film not having undergone any release promoting treatment. The transfer temperature and the transfer pressure applied to the first resin layer 21 when the first resin layer 21 was provided on, i.e., transferred to, the substrate 1 was set to 80° C. and 0.5 MPa, respectively.

Figure 4B:
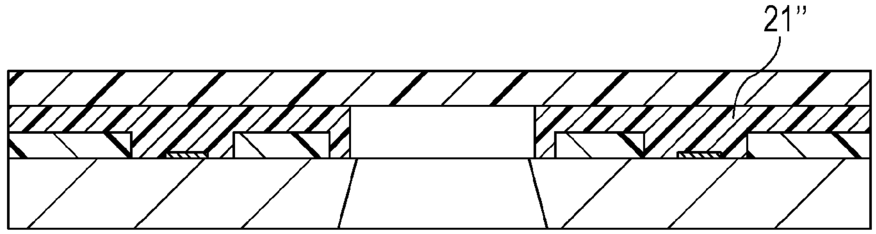

Subsequently, as illustrated in FIG. 4B, the first resin layer 21 was dry-etched from the second side (back side) of the substrate 1 that was opposite the first side through the supply port 11, whereby the first resin layer portion 21' that was above the supply port 11 was removed.

Figure 4C:
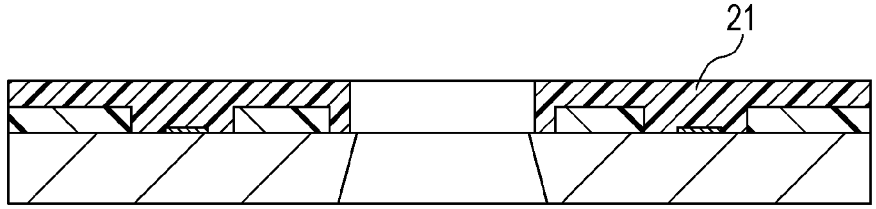

Subsequently, as illustrated in FIG. 4C, the first supporting member 23 was released from the patterned first resin layer 21.

Subsequently, as in the steps according to Example 1 illustrated in FIGS. 3D to 3H, a channel 12 and ejection orifices 13 were provided, whereby a liquid ejection head was manufactured. The liquid ejection head thus manufactured had no distortion in the ejection orifice member, and the channel 12 had a desired height.

When printing was performed by using this liquid ejection head, favorable ejection characteristics were obtained.

Comparative Example

Figure 5B:
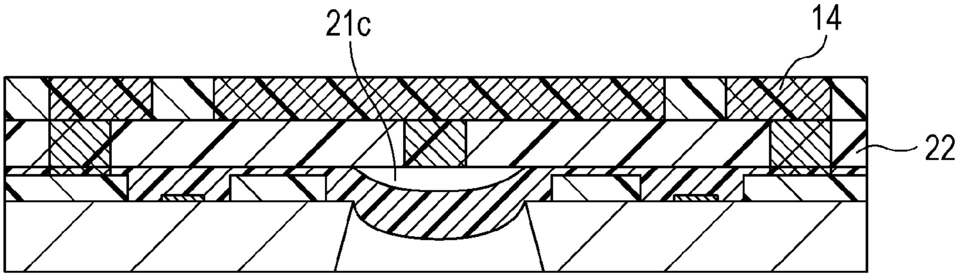
Figure 5C:
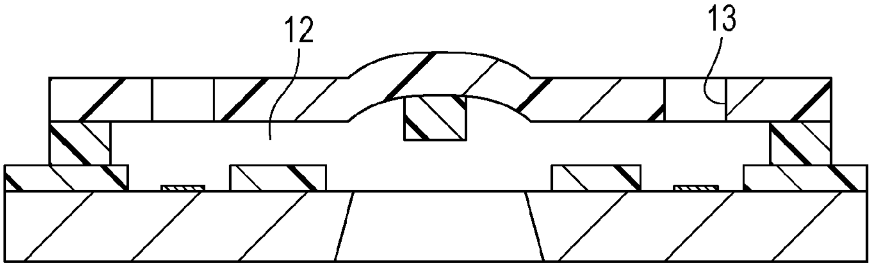

FIGS. 5A to 5C are sectional views illustrating exemplary steps of manufacturing a liquid ejection head according to a known art.

First, as illustrated in FIG. 5A, a first resin layer 21 formed on a first supporting member (not illustrated) was positioned on a substrate 1. Then, the first supporting member was released from the first resin layer 21, whereby the first resin layer 21 was transferred to the substrate 1. In this step, a first resin layer portion that was above the supply port 11 was found to be bent.

Subsequently, as illustrated in FIG. 5B, a second resin layer 22 made of a second negative photosensitive resin and a third resin layer 14 made of a third negative photosensitive resin were formed on the first resin layer 21. Consequently, an air gap 21*c* was provided between the first resin layer 21 and the second resin layer 22. Subsequently, the same steps as in Example 1 illustrated in FIGS. 3D to 3H were performed, whereby a liquid ejection head having a channel 12 and ejection orifices 13 was obtained.

In the PEB process performed in Comparative Example, the air gap 21*c* expanded. Consequently, an ejection orifice member that was deformed as illustrated in FIG. 5C was obtained.

When printing was performed by using this liquid ejection head, defective print occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005744, filed Jan. 16, 2014, which is hereby incorporated by reference herein in its entirety.

What is claimed is:

1. A method of manufacturing a structure comprising:

(1) positioning a first resin layer, which is made of a dry film, provided on a first supporting member on a substrate having a through hole while heating and pressurizing the first resin layer, with the first resin layer facing toward the substrate, and releasing the first supporting member from the first resin layer; and (2) positioning a second resin layer provided on a second supporting member on the first resin layer from which the first supporting member has been released, with the second resin layer facing toward the first resin layer, and releasing the second supporting member from the second resin layer, wherein a first resin layer portion that is above the through hole is removed simultaneously with the releasing of the first supporting member with the first resin layer portion being stuck to the first supporting member, and wherein a thickness of the first resin layer is 8 μm or smaller.

2. The method of manufacturing a structure according to claim 1, wherein the first supporting member is released at a releasing speed of 20 mm/s or greater.

3. The method of manufacturing a structure according to claim 1, wherein a shape of one of openings of the through hole that is nearer to the first resin layer is defined by a plurality of sides, and wherein the first supporting member is released from the first resin layer in a direction other than respective directions in which the plurality of sides extends.

4. The method of manufacturing a structure according to claim 1, wherein the first resin layer portion is removed by etching performed through the through hole.

5. The method of manufacturing a structure according to claim 4, wherein the first resin layer portion is dry-etched.

6. The method of manufacturing a structure according to claim 1, wherein the first resin layer is made of a negative photosensitive resin.

7. The method of manufacturing a structure according to claim 1, wherein the second resin layer is made of a negative photosensitive resin.

8. The method of manufacturing a structure according to claim 1, further comprising the step of performing heating after the step (2).

9. A method of manufacturing a liquid ejection head, the liquid ejection head including a channel member in which an ejection orifice from which a liquid is ejected and a channel that communicates with the ejection orifice are provided, the channel member including an ejection orifice member in which the ejection orifice is provided and a channel sidewall member that provides sidewalls of the channel; and a substrate having a supply port from which the liquid is supplied into the channel, the method comprising:

(1) positioning a first resin layer, which is made of a dry film and to be the channel sidewall member, provided on a first supporting member on a substrate having a through hole while heating and pressurizing the first resin layer, with the first resin layer facing toward the substrate, and releasing the first supporting member from the first resin layer; and (2) positioning a second resin layer, which is to be the ejection orifice member, provided on a second supporting member on the first resin layer from which the first supporting member has been released, with the second resin layer facing toward the first resin layer, and releasing the second supporting member from the second resin layer, wherein a first resin layer portion that is above the through hole is removed simultaneously with the releasing of the first supporting member with the first resin layer portion being stuck to the first supporting member, and wherein a thickness of the first resin layer is 8 μm or smaller.

* * * * *